Patented May 4, 1937

2,078,962

UNITED STATES PATENT OFFICE 2,078,962

PROCESS OF MAKING VEGETABLE MILK

Harry Willis Miller, Shanghai, China

No Drawing. Application December 3, 1935,
Serial No. 52,728

4 Claims. (Cl. 99—64)

This invention relates to a process of making vegetable milk, and it is an object of the invention to provide a method of this kind especially for the production of vegetable milk from the soya bean, the various steps of the process being physical and at no time chemical.

It is also an object of the invention to provide a process of this kind whereby the product is free of unpleasant odors and bitterish tastes and wherein the various steps comprised in the method in no way denatures the protein or affects the solubility of the product or in any other way detracts from the high food values of the original soya bean.

Another object of the invention is to provide a process for making a vegetable milk which has high nutritional qualities combined with small expenditure in digestive secretion and which has but little residue and which tends to promote peristolic activity.

A further object of the invention is to provide a process for the making of vegetable milk without the addition of any animal product and wherein the milk as produced by the process embodies an even emulsified mixture without a coagulum rising to the top or a whey settling to the bottom.

The process also has for an object the production of a vegetable milk and particularly a milk powder of balanced formula the equivalent of animal milk and that has keeping powers under standard preserving conditions when placed in tins or especially prepared paraffin-treated cartons.

In my improved process any of several hard white or yellow varieties of the soya bean may be selected and then after being cleansed such beans are soaked for a definite period of time depending upon the water temperature. The water must not be too cold nor too warm but preferably varying between 60° F. and 75° F. The beans should remain soaking from 6 to 10 hours but it is important that this soaking should not continue too long as if soaked too long or in water too warm the taste is definitely affected by a slightly bitter flavor.

I find it of particular benefit to soak one pound of dried soya beans in eight pounds of water.

After desired soaking the beans are ground to a pulp in a manner whereby the entire cellular structure of the beans will be thoroughly exposed through the grinding mill so as to readily yield all of the contained food elements to be extracted. It has, therefore, been found of decided advantage to grind the soaked beans in a burr mill and during the grinding operation to constantly add a small stream of water to the beans. The beans should be ground to the finest possible state.

During the grinding operation the water added is such as to result in the formation of about twenty gallons of pulp for twenty-five pounds of beans. By adding water during the grinding operation a more effective recovery is obtained of the nutritious elements of the bean as the grinding under water thoroughly works the fibre of the bean to wash out the soluble protein, fats, and minerals from the pulp.

The saturated mass is then placed in a suitable kettle and stirred or agitated while being heated to the boiling point, such boiling being continued until the pulp has lost its viscosity or stickiness so that when separated the pulp comes out quite dry. During this heating operation fumes are passed off and at the same time the gum within the fluid forms upon the surface of the fluid and which matter is skimmed off.

After the fluid has been heated to the boiling point it is then strained through a very fine straining cloth to separate cellular residue from the milk allowing only the food particles in solution to pass through. This straining operation is preferably facilitated by the use of a centrifuge making twenty-five hundred revolutions per minute. After this straining operation there is added to the fluid the essential foodstuffs to make a balanced milk and these added foodstuffs preferably comprise a cereal sugar (seven pounds) and a vegetable fat (seven pounds) together with salt (three ounces). This mixture is then heated to a boiling point and during this heating and cooking the fluid is agitated. This step of the process requires very constant attention for it is this cooking step that prevents the functioning of the fat splitting enzyme and to the most effective extent drives off the bitter substances that are of a volatile nature. This step, therefore, requires an active boiling under conditions in which coagulum is not allowed on the surface of the milk and the cooking is continued for a period of time to cause the entire taste of the milk to be changed from a beany flavor to what may be termed a "nutty" flavor. The cooking operation also continues for a period of time sufficient to drive off all of the volatile substances therein affecting its taste. This cooking step occurs for a period from thirty minutes to an hour.

After this cooking step the milk is passed through a colloid mill, or viscolizer or homogenizer, for emulsification and splitting up of the oil and cellular capsules about the food granules. In this step the rotating type of mill is preferred as such type of mill exercises a shearing action on the small food particles, fraying them out into a very finely divided emulsion constituting a true colloidal mixture. This step also lightens the color of the product.

After proper cooling the milk after leaving the colloid mill is ready for bottling or such milk without cooling can be pumped into the hot air chambers of a milk powder machine and the milk reduced to a milk powder.

I wish to particularly emphasize that my improved process as herein disclosed embodies the preparation or manufacture of the milk directly from the whole bean instead of from a bean flour and that the process particularly embodies the modifying and building up of the milk through the addition of oil and carbohydrates to give proportions of animal milk, and that such combination or mixture is then thrown into a homogenous colloid milk that retains its body as a milk for a protracted period of time if kept under complete refrigeration. I also wish to further emphasize that my improved process through the utilization of the homogenizer embodies the principles of making a colloid milk with complete emulsification, arriving at any desired formula of protein, fats, carbohydrates, or mineral content that the requirements of the dietitian or the feeding expert may suggest. Furthermore, the process as herein disclosed is one which preserves the vitamins of the oil and that the powder produced from the milk is one which will completely dissolve into a thoroughly emulsified liquid of the same characteristics as the milk initially entering the milk powder machine.

My process as herein disclosed is one which produces a milk from soya beans that is easily digested, highly nutritious and pleasing in taste and which is mainly due to the fact that the milk has been produced by a physical method rather than by chemical means as by a physical method a process is possible which in no way denatures the proteins or affects solubility or in any other way detracts from the high food values of the original soya bean. My improved process extracts from the soya bean approximately eighty-five percent of its protein and seventy percent of its fat together with vitamins A, B, E and G and the larger portion of mineral ash and vitamins C and D are added to the milk by the use of wholesome, readily digested carbohydrates in the form of dextrose and maltose sugars, thus giving a complete food answering every requirement of human nutrition from earliest infancy to adult life and old age. The milk made according to my process contains 3.5% to 4% of the complete protein. By complete protein is meant protein that serves adequately the body's need for growth and repair.

My improved process also preserves the natural oil of the soya bean but additional edible vegetable oil is added to bring the fat content of the milk up to substantially 5%. This natural oil of the soya bean is rich in lecithin therefore, permitting my product to embody an important constituent necessary for all organs of the body but particularly for building up nervous tissues and for the heart and liver, as the oil of the milk by my improved process is emulsified to a very fine degree and this assures ready action of the digestive juices upon the fats. It is also to be stated that the calcium and phosphorous content of the milk is slightly above that of animal milk and is sufficient to meet the requirements of normal bone and teeth development. The carbohydrate content of the milk is slightly above 5% which is an amount sufficient to supply the fuel for heat production and to give working power. The milk as produced by my process also creates an alkaline reserve thereby lessening body decay and the milk also creates and maintains a favorable intestinal flora.

I claim:—

1. A process of preparing vegetable milk from soya beans comprising the steps of soaking whole beans, grinding the soaked beans to a pulp to expose the cellular structure of the beam and adding water during the grinding operation, separating the liquid from the pulp, heating the liquid to the boiling point, adding sufficient elements such as sugar, vegetable fats and salt, agitating the mixture during the cooking operation, and then passing the fluid through a homogenizer.

2. A process of preparing vegetable milk from soya beans comprising the steps of soaking whole beans, grinding the soaked beans to a pulp to expose the cellular structure of the beans and adding water during the grinding operation, separating the liquid from the pulp, heating the liquid to the boiling point, adding sufficient elements such as sugar, vegetable fats and salt, agitating the mixture during the cooking operation, said cooking operation continuing until the liquid changes from a beany flavor to a nutty flavor, and then passing the fluid through a homogenizer.

3. A process of preparing vegetable milk from soya beans comprising the steps of soaking from six to ten hours one part of whole beans in eight parts of water of a temperature between sixty degrees and seventy-five degrees, Fahrenheit, grinding the soaked beans to a pulp to expose the cellular structure of the beans and adding water during the grinding operation, separating the liquid from the pulp, heating the liquid to the boiling point, adding sufficient elements such as sugar, vegetable fats and salt, agitating the mixture during the cooking operation and then passing the fluid through a homogenizer.

4. A process of preparing vegetable milk from soya beans comprising the steps of soaking from six to ten hours one part of whole beans in eight parts of water of a temperature between sixty degrees and seventy-five degrees Fahrenheit, passing the soaked beans through a grinder to comminute the beans to expose the cellular structure of the beans and adding water during the grinding operation to produce a mass of approximately twenty gallons of water and twenty-five pounds of triturated beans, separating the liquid from the pulp, heating the liquid to the boiling point, adding sufficient elements such as sugar, vegetable fats and salt, agitating the mixture during the cooking operation, and then passing the fluid through a homogenizer.

HARRY WILLIS MILLER.